United States Patent Office 3,411,377
Patented Nov. 19, 1968

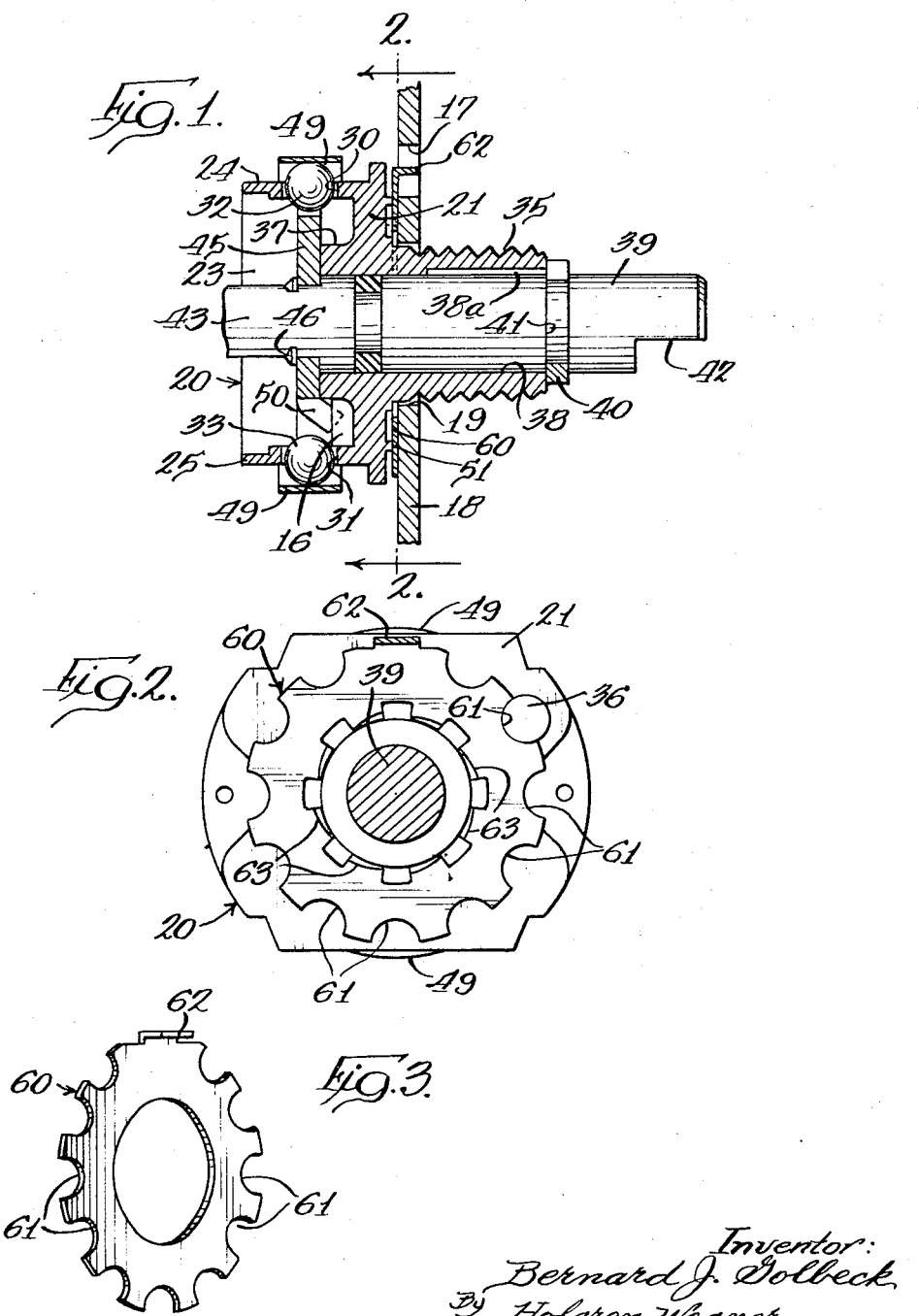

3,411,377
INDEX MECHANISM WITH MEANS FOR ADJUSTING THE ANGULAR ORIENTATION THEREOF
Bernard J. Golbeck, Crystal Lake, Ill., assignor to Oak Electro/Netics Corporation, a corporation of Delaware
Filed Mar. 3, 1967, Ser. No. 620,468
11 Claims. (Cl. 74—527)

ABSTRACT OF THE DISCLOSURE

An adapter member for an index mechanism of a rotary electric switch having a fixed locating lug thereon, in which the adapter member is provided with a plurality of equiangularly spaced notches at the outer periphery thereof each being adapted to embrace the locating lug selectively, and wherein a further locating member extends outwardly from the outer periphery of the adapter member, so that the adapter member can be rotated relative to the index mechanism to position different ones of the peripheral notches selectively in engagement with the index mechanism locating lug, and the adapter member locating member can be inserted through an opening in a mounting plate to vary the position of the index mechanism relative to the mounting plate.

Cross reference to related application

This application discloses an improvement upon the index mechanism disclosed and claimed in Lewandowski et al. Patent 3,293,382, assigned to the assignee of the present application.

Background of the invention

This invention relates in general to rotary electrical switching devices, and more particularly to rotary electric switching devices of the type including an index mechanism having detent means for releasably retaining a switch rotor at a selected switching position relative to a switch stator.

In switching devices of the type set forth in the preceding paragraph, it has been conventional to provide a locating lug on the outer surface of the index mechanism that is receivable within an opening in a mounting plate for the switch, to orient the switch angularly at a fixed position relative to the mounting plate. Such an arrangement is typified by that disclosed in the above-mentioned Lewandowski et al. patent. It is often desired to be able to change the angular position of the switch relative to its mounting plate, and heretofore, it has not been possible to alter the angular orientation of the switch without forming a plurality of openings in the mounting plate. Thus, when it has become necessary to reorient the switch, it has been common to completely rewire the switch stator.

Summary of the invention

Accordingly, an object of the present invention is to provide an index mechanism for a rotary electric switch with structure whereby the angular orientation of the switch relative to its mounting plate can be readily changed, without the necessity of forming more than one hole in the mounting plate, and thus obviating the necessity of completely rewiring the switch.

In an exemplary embodiment of the invention, an annular adapter member is received over the mounting bushing of the switch index mechanism, and a plurality of equiangularly spaced locating notches are provided at the outer periphery of the adapter member, and are selectively positionable in embracing engagement with the fixed locating lug on the index mechanism to position the adapter member at a desired location relative to the index mechanism. The adapter member has a locating member formed integrally therewith, and the locating member extends perpendicularly outwardly from the outer periphery of the adapter member so as to be positionable within the single opening in the mounting plate to provide a means for readily angularly orienting the switching device in a desired relationship with respect to the mounting plate.

Brief description of the drawings

FIG. 1 is a central sectional view through the index mechanism of a rotary electric switch, and illustrates a first embodiment of the invention;

FIG. 2 is a view taken generally along line 2—2 of FIG. 1; and

FIG. 3 is a perspective view of a modified form of the invention.

Description of the preferred embodiments

While this invention is susceptible of embodiment in many different forms, there is shown in the drawings and will herein be described in detail a preferred embodiment and a modification thereof of the invention with the understanding that the present disclosure is to be considered as an exemplification of the principles of the invention and is not intended to limit the invention to the embodiments illustrated. The scope of the invention will be pointed out in the appended claims.

Referring now to the drawing in detail, the index mechanism includes a housing 20 having the generally rectangularly shaped base 21. A pair of walls 23 (only one of which is shown), are provided at opposite sides of base 21, and define therebetween a rearwardly open chamber having generally open sides between the walls. A pair of upright wall sections 24 and 25 extend rearwardly from base 21 at opposite sides thereof. Upright wall sections 24 and 25 are each spaced a substantial distance from walls 23 to define open spaces therebetween. Bores 30 and 31 are provided in upright wall sections 24 and 25 respectively, and slidably receive therein detent members in the form of balls 32 and 33, respectively.

A generally cylindrical boss 35 extends forwardly from the front face of base 21, and is adapted to be inserted through a first opening 19 in a mounting plate 18. Boss 35 is formed integrally with base 21, and is externally threaded for reception of a nut (not shown) to retain the index mechanism on the mounting plate. A cylindrical locating stud 36 is provided on the front face of base 21 adjacent one corner thereof, and is adapted to be positioned in a second opening 17 in the mounting plate 18, as is well known in the art. It will be understood, that with the stud 36 positioned in opening 17, and the externally threaded boss 35 positioned in opening 19, the index member is nonrotatably located at a single fixed position on the mounting plate 18. As will hereinafter be explained in detail, the present invention provides means whereby the index mechanism may be angularly adjusted relative to the mounting plate 18.

A second boss 37 is formed integrally with and extends rearwardly from base 21, and terminates within the chamber formed between walls 23. An axial extending bore 38 is provided in bosses 35 and 37, and in base 21 for rotatable reception of an operating shaft 39. As can be seen in FIG. 1, longitudinally extending grooves 38a are provided in bore 38, and are adapted to receive a suitable lubricant therein to facilitate rotation of shaft 39. Means are provided for preventing axial movement of the shaft 39 outwardly of the housing 20, and includes a C washer 40 provided in a circumferential groove 41 in the shaft 39. Shaft 39 includes a flattened portion 42 at the outer end thereof, as is well known in the art, for reception of an operating knob not shown. The inner end of shaft 39 is provided with a portion 43 of "Double D" cross sectional configuration upon which the rotors (not shown) of the switch sections are mounted.

An index member in the form of a generally circular disc 45 is mounted on the shaft portion 43 in the housing 20, and is abutted against boss 37 as can be best seen in FIG. 1. A suitable retention member 46 may be provided in a circumferential groove in the shaft 43 adjacent the rearward face of the index disc 45 to hold the index disc against the end of boss 37, and to prevent movement of the shaft 39 outwardly of the housing 20. A plurality of circumferentially spaced radial enlargements (not shown) are provided around the periphery of disc 45, and define therebetween notches or recesses that are engaged by the balls 32 and 33 to locate the index disc 45 (and the rotor sections carried by the shaft portion 43) in a desired angular position. Leaf springs 49 are provided outwardly of wall sections 24 and 25 to bias the balls 32 and 33 towards the index disc 45. A tab 50 extends forwardly from index disc 45, and is engageable with a stop 16 formed integrally with the rear face of base 21 to limit the rotational movement of shaft 39 in both directions.

The means for adjusting the angular position of the index mechanism includes a thin, flat, annularly shaped adapter member 60 that is received over threaded boss 35, and which is interposed between the front face of base 21 and mounting plate 18. As can be seen in FIG. 1, an annular rib 51 is provided on the front face of base 21 concentric with and outwardly of boss 35, and the rear face of the adapter member 60 abuts against the outer face of rib 51. Adapter member 60 includes a plurality of equiangularly spaced generally semicircular notches 61 in the outer periphery thereof, and notches 61 are sized so as to closely embrace the locating lug 36 on the index mechanism. A locating member 62 is formed integrally with adapter member 60, and extends generally perpendicularly forwardly therefrom at the outer periphery thereof. As can be seen in FIG. 1, the locating member 62 is positionable in opening 17 in mounting plate 18 to locate the index mechanism as will hereinafter be explained. In the embodiment of FIGS. 1 and 2, a plurality of sharpened teeth or tabs 63 are struck outwardly from the front face of adapter member 60 at the inner diameter thereof, and teeth 63 bear against the rear face of mounting plate 18, and cause adapter member 60 to function as a lock washer when the locking nut (not shown) is threaded upon boss 35. The adapter member illustrated in FIG. 3 is identical with the embodiment illustrated in FIGS. 1 and 2, except that the teeth 63 are not provided.

From the foregoing it is believed apparent that the provision of the adapter member 60 enables the angular position of the index mechanism to be varied and adjusted, as desired. All that need be done is to place the adapter member 60 over the boss 35, insert the locating lug 36 on the index mechanism within the appropriate notch 61 in the outer periphery of the adapter member, and insert the locating member 62 within opening 17 in mounting plate 18. The combined thickness of rib 51 and adapter member 60 is substantially the same as the length of locating lug 36, so that when the mounting nut is threaded on boss 35, the forward end of lug 36 and the forward face of adapter member 60 will be disposed generally in the same plane, and the index mechanism will fit flushly against the rear face of the mounting plate.

I claim:

1. In an index mechanism for a rotary electric switch that is adapted to be positioned against a mounting plate, said index mechanism having a fixed locating member extending outwardly therefrom and adapted to be received in an opening in said mounting plate to position said index mechanism at a fixed location relative to said plate, the improvement comprising: an adapter member positionable against said index mechanism; means on said adapter member for selectively positioning the same at one of a plurality of positions spaced angularly from one another relative to said index mechanism, said means being defined by a plurality of generally identical surfaces spaced angularly around said adapter member and each locatable in a position embracing said index mechanism locating member to orient said adapter member in a desired angular relationship relative to said index mechanism; and a locating member on said adapter member positionable in the opening in said mounting plate to locate said index mechanism at a preselected angular position on said mounting plate.

2. An index mechanism as set forth in claim 1 in which said index mechanism includes a boss extending outwardly therefrom and positionable through an opening in said mounting plate, and wherein said adapter member is generally annularly shaped and received over said boss.

3. An index mechanism as set forth in claim 1 wherein said generally identical surfaces are spaced equiangularly around said adapter member.

4. An index mechanism as set forth in claim 1 wherein said generally identical surfaces are provided around the outer periphery of said adapter member.

5. An index mechanism as set forth in claim 5 wherein said generally identical surfaces are each defined by an arcuate notch.

6. An index mechanism as set forth in claim 1 wherein the outer surface of said adapter member is positioned generally in the same plane as the outer end of said index mechanism locating member.

7. An index mechanism as set forth in claim 1 wherein said adapter member locating member extends generally peripherally outwardly from said adapter member.

8. An index mechanism as set forth in claim 1 wherein said adapter member locating member is formed integrally with said adapter member.

9. An index mechanism as set forth in claim 1 in which said adapter member is annularly shaped, and wherein a plurality of teeth are provided around the inner periphery of said member, said teeth each including a portion extending outwardly from the front face of said member.

10. In an index mechanism for a rotary electric switch that is adapted to be positioned against a mounting plate, said index mechanism having an externally threaded mounting bushing extending outwardly from one face thereof and adapted to be received in a first opening in said mounting plate, said index mechanism having a fixed generally cylindrical locating member extending outwardly from said one face and adapted to be received in a second opening in said mounting plate to position said index mechanism at a fixed location relative to said plate, the improvement comprising: a thin, flat annularly shaped adapter member positionable against said index mechanism face, the outer surface of said adapter member being positioned generally in the same plane as the outer end of said index mechanism locating member; means on said adapter member for selectively positioning the same at one of a plurality of positions spaced angularly from one another relative to said index mechanism, said means being defined by a plurality of generally identical arcuate surfaces spaced equiangularly around the outer periphery of said adapter member and each locatable in a position embracing said index mechanism locating member to orient said adapter member in a desired angular relationship relative to said index mechanism; and a locating member integral with said adapter member and extending generally perpendicularly outwardly therefrom at the outer periphery thereof, said adapter member locating member being positionable in the opening in said mounting plate to locate said index mechanism at a preselected angular position on said mounting plate.

11. An index mechanism as set forth in claim 10 wherein a plurality of teeth are provided around the inner periphery of said adapter member, said teeth each including a portion extending outwardly from the front face of said adapter member.

References Cited

UNITED STATES PATENTS

| | | | |
|---|---|---|---|
| 2,092,371 | 9/1937 | Douglas | 248—27 X |
| 2,435,857 | 2/1948 | Wermer | 74—528 |
| 2,493,184 | 1/1950 | Budd et al. | 200—168 |
| 2,616,643 | 11/1952 | Budd | 248—27 |
| 2,654,641 | 10/1953 | Veatch et al. | 74—504 X |
| 2,834,316 | 5/1958 | Perez et al. | 74—528 |
| 3,293,382 | 12/1966 | Lewandowski et al. | 74—527 X |

FRED C. MATTERN, Jr., *Primary Examiner.*

C. F. GREEN, *Assistant Examiner.*

PO-1050
(5/69)

UNITED STATES PATENT OFFICE
CERTIFICATE OF CORRECTION

Patent No. 3,411,377    Dated November 19, 1968

Inventor(s) Bernard J. Golbeck

It is certified that error appears in the above-identified patent and that said Letters Patent are hereby corrected as shown below:

Column 4, line 23,    change the numeral "5" to -- 1 --.

SIGNED AND
SEALED

DEC 2 - 1969

(SEAL)
Attest:

Edward M. Fletcher, Jr.
Attesting Officer

WILLIAM E. SCHUYLER, JR
Commissioner of Patents